United States Patent [19]

Barker et al.

[11] 4,201,679

[45] May 6, 1980

[54] DRILLING FLUID ADDITIVE

[75] Inventors: Larry D. Barker; James K. Bannerman, both of Houston, Tex.

[73] Assignee: Dresser Industries, Inc., Dallas, Tex.

[21] Appl. No.: 957,622

[22] Filed: Nov. 3, 1978

Related U.S. Application Data

[63] Continuation-in-part of Ser. No. 825,314, Aug. 17, 1977, abandoned.

[51] Int. Cl.$^2$ ............................................. C09K 7/02
[52] U.S. Cl. ............................ 252/8.5 A; 252/8.5 B; 252/317
[58] Field of Search ................. 252/8.5 A, 8.5 B, 317

[56] References Cited

U.S. PATENT DOCUMENTS

| | | | |
|---|---|---|---|
| 2,718,497 | 9/1955 | Oldham et al. | 252/8.5 |
| 2,775,557 | 12/1956 | Morgan | 252/8.5 |
| 3,081,260 | 3/1963 | Park | 252/8.5 |
| 3,766,229 | 10/1973 | Turner et al. | 252/8.5 X |
| 3,956,140 | 5/1976 | Nahm et al. | 252/8.55 X |

*Primary Examiner*—Herbert B. Guynn
*Attorney, Agent, or Firm*—Raymond T. Majesko; John N. Hazelwood

[57] ABSTRACT

Drilling fluid viscosifier which includes sepiolite and a partially hydrolyzed polyacrylamide polymer extender therefor.

3 Claims, 4 Drawing Figures

DRILLING FLUID ADDITIVE

RELATED APPLICATIONS

This application is a continuation-in-part of copending application Ser. No. 825,314, filed Aug. 17, 1977, now abandoned.

BACKGROUND OF THE INVENTION

During the initial make-up of drilling fluids viscosified with sepiolite clay minerals, the slurry is very thin because the fibers of the clay particles have not separated sufficiently. In order to provide a drilling fluid with sufficient viscosity to support drill solids and weighting materials, large amounts of shearing energy by mechanical mixers must be used in the mud pits to separate these bundles of fibers. In lieu of such mechanical mixers, the shearing energy can be achieved by circulation of the drilling fluid through the drill pipe, bit and annulus. This is not always practical because of drilling fluid weight considerations.

Alternatively, small amounts of bentonite, up to five pounds per barrel can be used. This is sometimes not desirable because of the subsequent inferior performance of bentonite as the mud reaches temperatures above 400° F. and the necessity of fresh water prehydration of the bentonite.

Accordingly, it is an object of the invention to provide a viscosifier for drilling fluid that can be used in all types of water and can be used at high temperatures.

Another object of the invention is to provide a clay extender which will impart to a slurry of the sepiolite clay during initial make-up, a viscosity of sufficient nature to support a weighting agent without the need of excessive shearing energy.

DETAILED DESCRIPTION OF THE EMBODIMENT

Figure 1:
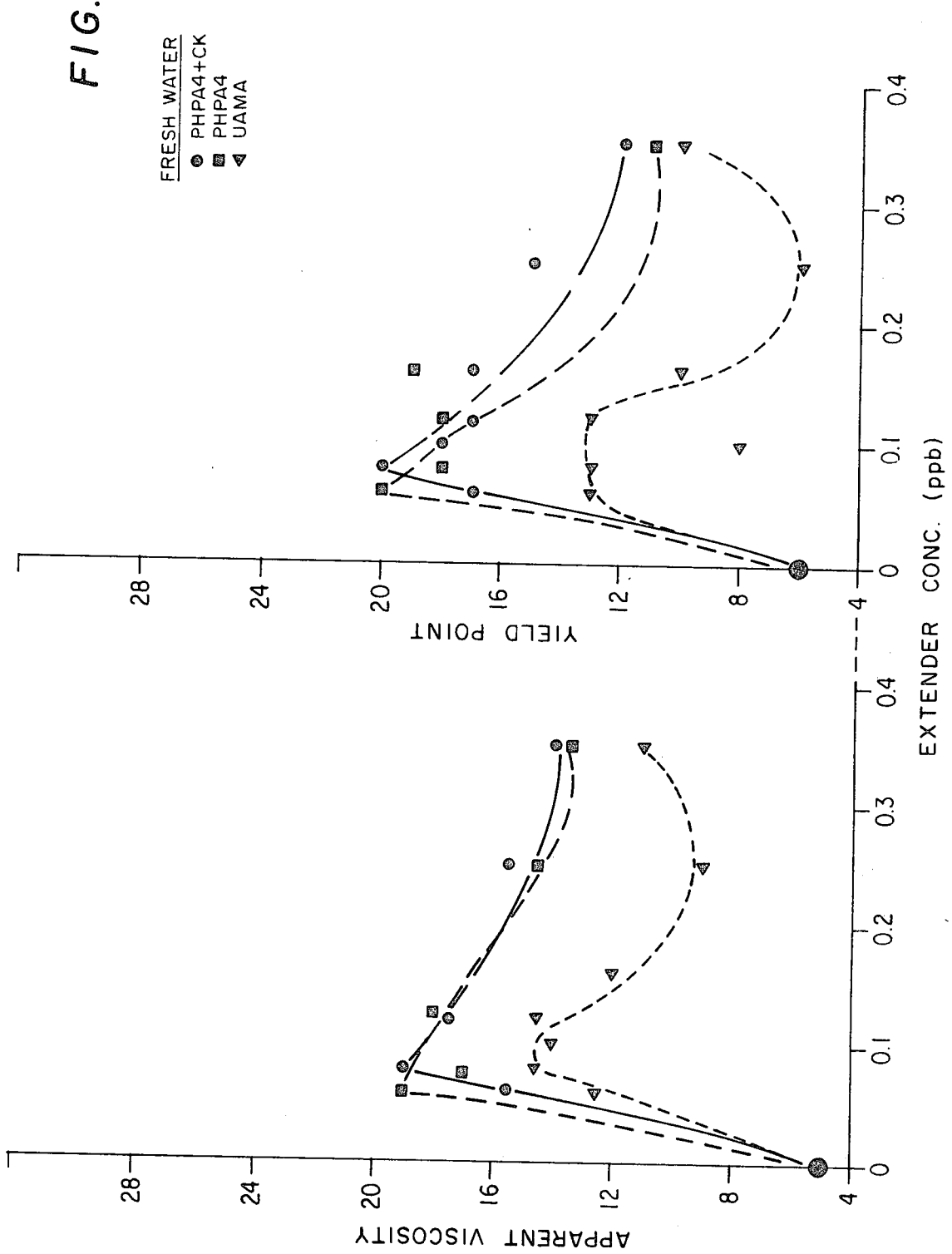
FIGS. 1 and 2 are graphs showing a plot of viscosity and yield point versus concentration for the extender of the present invention and an extender of the prior art in both fresh and saturated sodium chloride; and, FIGS. 3 and 4 are graphs showing a plot of yield point and viscosity for the extender of the present invention compared with similar polymers having a higher and lower molecular weight in both fresh water and saturated sodium chloride.

In accordance with the present invention, there is provided a drilling fluid viscosifier. The viscosifier consists essentially of sepiolite and a partially hydrolyzed polyacrylamide polymer extender therefor. The polymer has the general formula $(CH_2CHCONH_2)_x$, where $x$ ranges between about 5600 and 14,900.

The extender, which has a molecular weight between about 400,000 and 900,000, is present in an amount between about 0.01 and 0.25 pounds per 15 pounds of sepiolite.

The extender may contain, in addition, an inert substrate, such as calcined kaolinite. The substrate is preferably present in an amount between about 15% and 35%.

The extender is usually hydrolyzed in an amount between about 20% and 80%.

Sepiolite is a mineral having the formula $Mg_4(Si_2O_5)_3(OH)_2 \cdot 6H_2O$. The mineral is a soft, light weight absorbent, white to light gray or light yellow clay mineral. Chemically, it contains approximately 55% $SiO_2$, 0.7% $Al_2O_3+Fe_2O_3$, 25% MgO, 0.5% CaO, 0.4% alkalies and the balance $H_2O$. Its density is approximately 2.1.

The extender and inert substrate, if desired, can be added to the sepiolite in any reasonable manner to obtain the results of this invention. From a practical standpoint, it will ordinarily be preferred to add the extender to the clay after the clay has been ground and dried. The resulting product can then be sacked in a conventional manner. However, if desired, the clay and extender and inert substrate can be separately added to water to form a slurry, the extender and clay being added in any desired order. This type of wet mixing could be employed, for example, at the well site, but ordinarily it would not be preferred because the mixing in the dry form prior to sacking permits closer quality control and a more uniform product. More practical, the contents of the package would be added to water to make a slurry at the well site.

Merely by way of example and referring to the drawings, a number of test samples were prepared. For all tests, a slurry was prepared by adding sepiolite to water in a concentration of 15 lbs/barrel. The samples were sheared for 10 minutes in a Waring blender. In these tests, various extenders were added to determine the yield point and apparent viscosity at various concentrations. The legends on the graphs have the following meanings:

PHPA4+CK—75% partially hydrolyzed polyacrylamide polymer with approximately 30% hydrolysis and a molecular weight of about 450,000 plus 25% calcined kaolinite.

PHPA4—Partially hydrolyzed polyacrylamide with approximately 30% hydrolysis and a molecular weight of about 450,000.

VAMA—Vinyl acetate maleic anhydride (extender of the prior art).

PHPA2—Partially hydrolyzed polyacrylamide with approximately 30% hydrolysis and a molecular weight of about 200,000.

PHPA100—Partially hydrolyzed polyacrylamide polymer with approximately 30% hydrolysis and a molecular weight of about 10,000,000.

Figure 2:
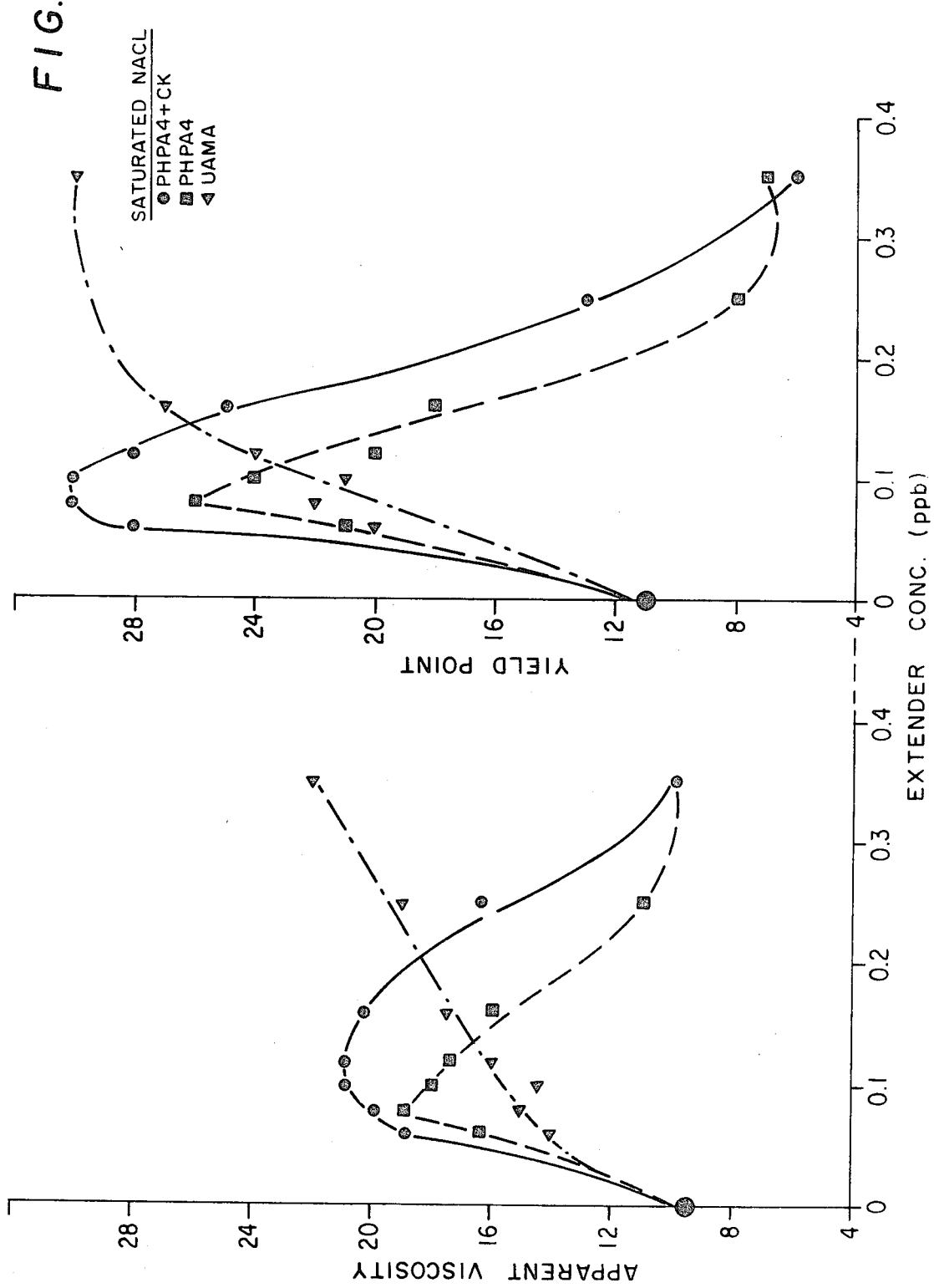

Referring to FIG. 1, it can be seen that in fresh water PHPA4+CK developed a maximum yield point of 20 and a maximum viscosity of 19, compared to a maximum of 13 and 14.5 for VAMA. As shown in FIG. 2, in salt water, a similar yield point and viscosity were reached by both, however, three times the concentration was required of VAMA.

FIGS. 1 and 2 also show the results of tests on the extender without the inert substrate. The results show that very similar viscosities and yield point were attainable in both fresh water and salt water. The inert substrate is beneficial to ease handling problems due to the hygroscopic nature of the polymer.

Figure 3:
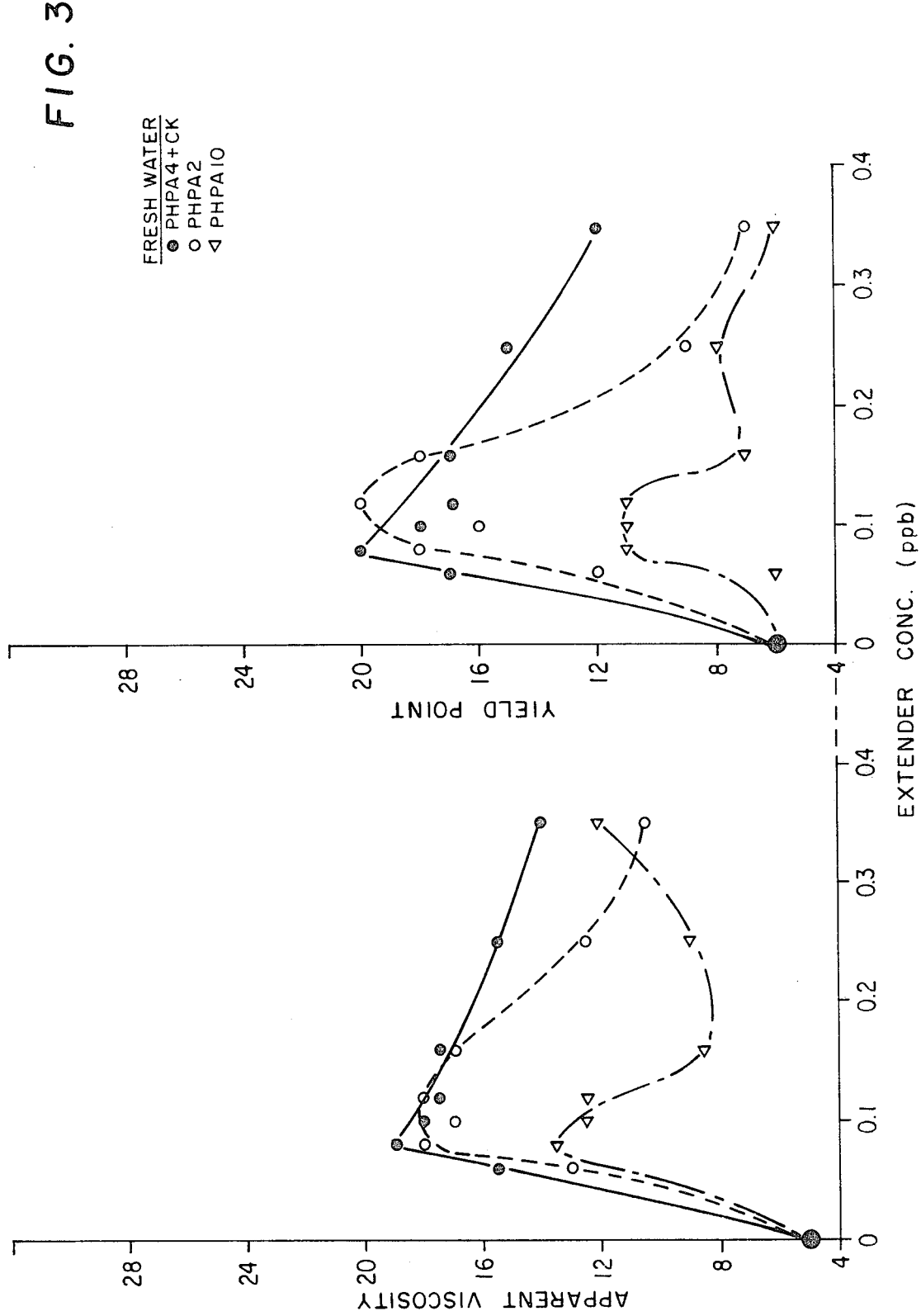
Figure 4:
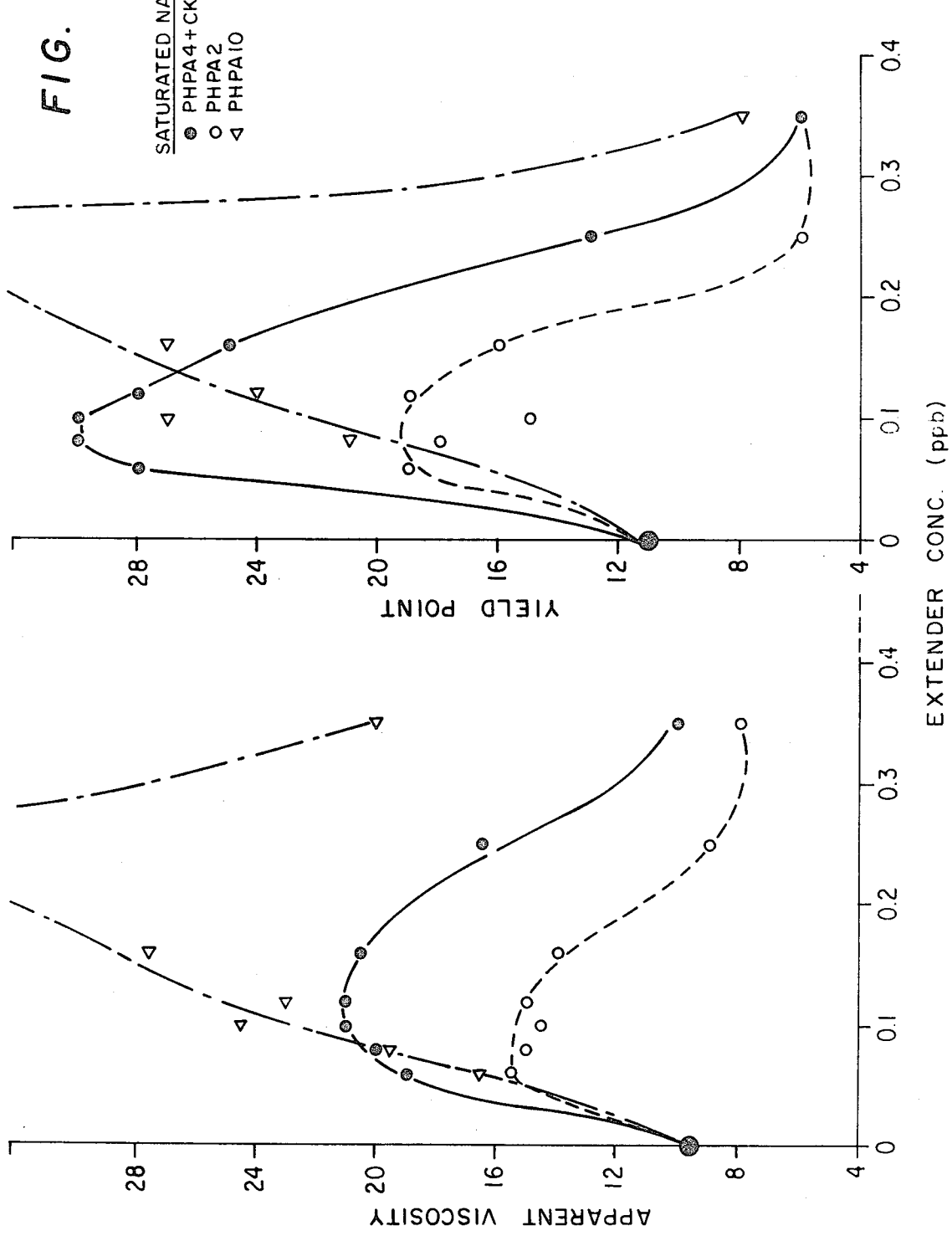

FIGS. 3 and 4 show the results of tests using the extender of the present invention compared with a similar material having lower and higher molecular weights.

The lower molecular weight polymer exhibited properties similar to the material of the present invention in fresh water, but was inferior in salt water. The high molecular weight material was inferior to the present invention in fresh water, even though developing higher viscosities and yield points in salt water.

Accordingly, the present invention is a distinct improvement over all other materials tested, when considered for use in both fresh and salt water systems.

While the invention has been described with regard to certain embodiments, it is intended that the foregoing be construed as illustrative and not in limitation of the invention.

The embodiments of the invention in which an exclusive property or privilege is claimed are defined as follows:

1. A drilling fluid viscosifier consisting essentially of sepiolite and a 20% to 80% hydrolyzed polyacrylamide polymer extender therefor, having the general formula $(CH_2CHCONH_2)_x$, where x ranges between about 5600 and 14,900, said extender being present in an amount between about 0.01 and 0.25 pounds per 15 pounds of sepiolite.

2. The viscosifier of claim 1, which contains, in addition, an inert substrate, calcined kaolinite.

3. The viscosifier of claim 2, in which the inert substrate is present in an amount between about 15% and 35%.

* * * * *